United States Patent [19]
Bersaw

[11] 3,990,682
[45] Nov. 9, 1976

[54] WIRE FENCE STRETCHING TOOL

[75] Inventor: Francis S. Bersaw, West Rutland, Vt.

[73] Assignee: Lawrence Peska Associates, Inc., New York, N.Y. ; a part interest

[22] Filed: Oct. 2, 1975

[21] Appl. No.: 618,909

[52] U.S. Cl. .................................... 256/37; 254/80
[51] Int. Cl.² ......................................... B21F 27/00
[58] Field of Search ................ 256/37; 254/80, 83; 7/8.1 A; 52/728, 514

[56] References Cited
UNITED STATES PATENTS

| 224,992 | 3/1880 | Brinkerhoff | 254/80 |
| 2,221,277 | 11/1940 | Thompson | 254/80 |
| 3,309,824 | 3/1967 | Barrett | 52/728 |

*Primary Examiner*—Werner H. Schroeder
*Assistant Examiner*—Doris L. Troutman
*Attorney, Agent, or Firm*—Jack D. Slobod

[57] ABSTRACT

A tool for stretching barbed wire fencing to a fence post includes a wooden arm and a pivotly mounted wooden lever having metal jaws secured thereto in opposed relationship. The jaws have integral planar tongues positioned in stacked relationship between the arm and the lever. A pivot pin passes through the arm, lever and tongues. One edge of the arm has a concave surface covered with a sheet metal facing for engagement against the fence post.

2 Claims, 5 Drawing Figures

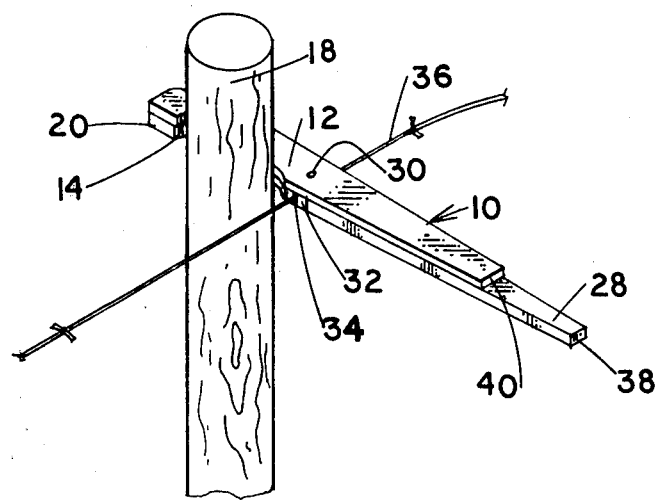
FIG. 1
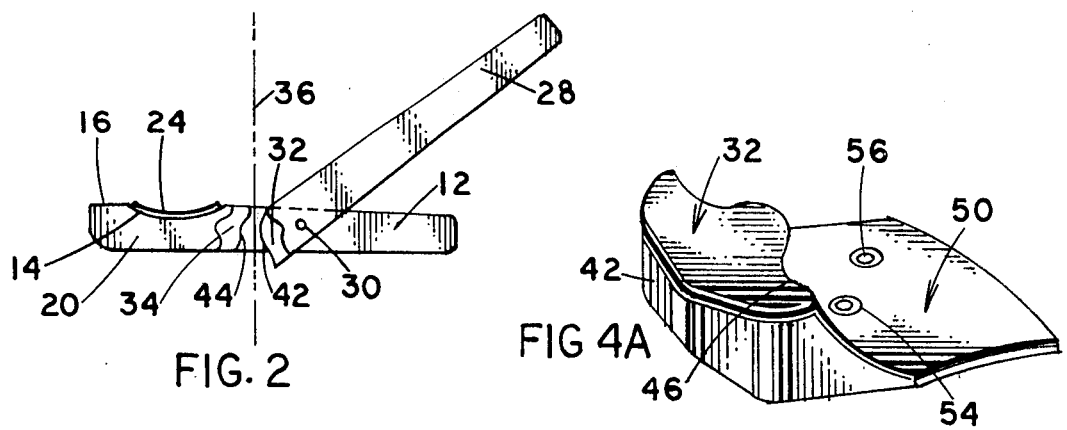
FIG. 2
FIG. 4A
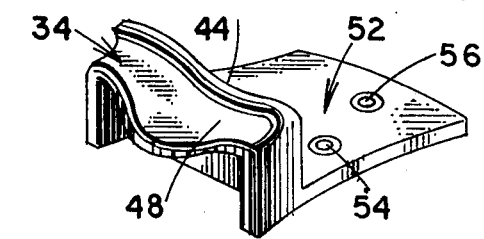
FIG. 4B
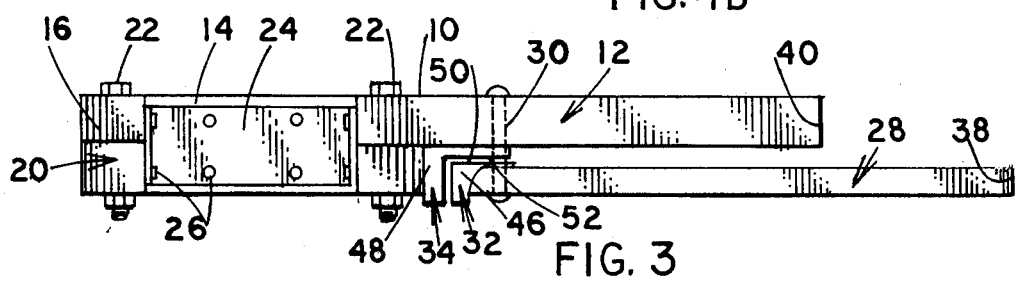
FIG. 3

WIRE FENCE STRETCHING TOOL

FIELD OF THE INVENTION

The present invention relates generally to wire fence stretching tools of the type having a pair of opposed relatively rotatable jaws for gripping a wire and a fulcrum surface for bearing the tool against a fence post. In its particular aspects the present invention relates to a wire fence stretching tool having removeable metal jaws with overlying tongues to receive the wear associated with rotating said jaws.

BACKGROUND OF THE INVENTION

Prior art wire fence strectching tools generally required that a hand would have to be kept around the relatively pivoted members of the tool to keep it engaged on a fence wire making it awkward to nail the wire to the fence post with just the other hand. Basically, in the prior art the members were rather loosely pivoted to avoid wear. Because of this loose pivoting the fence wire would not wedge itself between the jaws carried by the member in a manner to frictionally maintain the jaws closed.

If the danger of wear could be eliminated, it would be possible to pivot the members tightly in a manner that the tool could retain itself clamped about a fence wire. Then only the body need be leaned against the tool to keep the wire taught and both hands would be free for nailing.

OBJECTS OF THE INVENTION

It is an object of the present invention to provide a fence stretching tool having removeable and replaceable metal jaws for engaging the fence wire.

It is a further object of the present invention to provide a fence stretching tool having replaceable jaw members configured to receive substantially all the wear associated with the operation of the tool.

It is yet another object of the present invention to provide a fence stretching tool having a wear receiving facing along a fence post engaging surface.

SUMMARY OF THE INVENTION

Briefly, the aforementioned and other objects of the present invention are satisfied by providing an arm having a curved surface along one edge for engaging a fence post as a fulcrum. The surface is covered with a sheet metal facing. Also, the arm carries a removeable metal jaw intermediate its length. A lever is pivotly mounted to arm near one end of the lever which carries another jaw positioned opposite the aforementioned jaw for engaging the fence wire.

Each of the jaws have integral planar tongues which adjoin each other in stacked relationship between the arm and lever. Opposed planar surfaces of the tongues run against each other to receive any wear associated with the relative pivoting of the arm and lever and a pivot shaft means passes through the arm, lever and tongues.

As a result of the aforementioned configuration, the arm and lever may be tightly pivoted to enable a fence wire wedged between the arm and lever to maintain the jaws closed.

Other objects, features and advantages of the present invention will become apparent upon perusal of the following detailed description of the preferred embodiment thereof when taken in conjunction with the appended drawing wherein:

FIG. 1 is a pictorial presentation of the wire fence stretching tool of the present invention in use;
FIG. 2 is a bottom view of the tool in FIG. 1;
FIG. 3 is a side view of the tool in FIGS. 1 and 2; and
FIGS. 4A and 4B are enlarged pictorial presentations of a pair of opposed parts of the tool of FIGS. 1 through 3.

DETAILED DESCRIPTION

Referring to the drawing, the tool of the present invention is generally indicated by the reference numeral 10 and includes an elongated wooden arm 12 of rectangular cross-section which has a curved recessed surface 14 along edge 16 of the arm for engaging a fence post 18 as a fulcrum. To provide surface 14 with a large area, the thickness of edge 16 is approximately doubled by the provision of a matching elongated wooden block 20 secured along an end portion of the length of arm 12 as by bolts 22. Further, the resultant curved surface 14 of double thickness is covered with a rectangular strip of sheet metal 24 which is secured thereto by nails 26 as a facing or lining for preventing the wood from wearing.

A lever 28 is pivotly mounted to arm 12 with a pivot pin or smooth shanked bolt 30 passing through the arm and lever at a point intermediate the length of the arm. As best shown in FIG. 3, the lever 28 lies on the same side of arm 12 as does block 20 so that an end of the lever which is terminated with a removeable metal jaw 32 may be swung about pin 30 into opposed relationship with an end of block 20 which is terminated with a removeable metal jaw 34. The jaws 32 and 34 are carried so that a barbed wire 36 may be inserted therebetween when lever 28 is placed at an angle with arm 12. When the lever and arm are brought into line, the jaws 32 and 34 are closely spaced for gripping the wire 36. The end 38 of lever 28, remote from jaw 32, preferably extends beyond the end 40 of arm 12, remote from surface 14, so that horizontal force may be applied to lever 28 to simultaneously create a moment around fence post 18 and swing jaw 32 into opposition with jaw 34 for tightly engaging wire 36.

The jaws 32 and 34 are respectively shown in detail in FIGS. 4A and 4B. As shown therein the jaws 32 and 34, which are preferably forged steel, respectively have smoothly undulating mutually engageable surfaces 42 and 44 from which project shrouds 46 and 48 for respectively locating around the sides of lever 28 and blocks 20. Further, jaws 32 and 34 respectively have integral planar tongues 50 and 52 projecting perpendicularly at the roots of surfaces 42 and 44.

Tongues 50 and 52 each have countersunk countersuck hole 54 for receiving a wood screw (not shown) for fastening the tongues respectively to the arm 12 and lever 28. The tongues 50 and 52 also each have a hole 56 of a diameter for a close sliding fit about pivot pin 30. As shown in FIG. 3, the tongues 50 and 52 lie in stacked relationship between arm 12 and lever 28 and the pin 30 is inserted through the arm 30, the holes 56 in the stacked tongues 50 and 52, and through the lever 28.

It should be appreciated that the tongues 50 and 52 work or slide against each other as the lever 28 is rotated relative to arm 12.

In the use of tool 10, the wire 36 is clamped between jaws 32 and 34 by aligning the lever 28 with arm 12. In view of the tightly constrained pivot permitted by the combination of tongues 50 and 52 and pivot pin 32 and further due to the undulations of jaw faces 42 and 44, wire 36 wedges between the jaws in a manner to frictionally retain the lever 28 aligned with arm 12. Thus, it is not necessary to use a hand to retain the jaws 32 and 34 closed. With the tool engaged on wire 36 and positioned with facing 24 against fence post 18, force may be applied to end 38 of lever 28 with a hip for keeping the wire taught and the hands are free for securing the wire to the fence post.

While the preferred embodiment of the present invention has been described in specific detail, it should be understood that numerous modifications, additions and omissions in the details thereof are possible within the intended spirit and scope of the invention claimed herein.

What is claimed is:

1. A tool for tensioning a wire to a fence post, said tool comprising: an elongated arm having first and second ends; said arm having an arcuate side edge surface proximate said first end of said arm for engaging the side of a fence post; an elongated lever having first and second ends; said lever being pivotally mounted proximate the first end of said lever to a pivot point intermediate the length of said arm; said lever being alignable with said arm in a manner that the second end of said arm and lever face in the same direction; a first jaw rigidly secured to said first end of said lever; said first jaw facing outward from the first end of said lever; a second jaw rigidly mounted to said arm at a location proximate said pivot point; said second jaw facing toward the second end of said arm; said first and second jaws lying in opposed relationship for gripping said wire between said jaws in response to alignment of said arm and lever; said first and second jaws having generally planar integral apertured tongues lying in stacked relationship between said bar and said lever for running against each other; said lever being pivotally mounted to said arm by a pivot shaft means passing through said arm, said lever and said tongues of said first and second jaws at said pivot point.

2. The tool of claim 1 further comprising a sheet metal facing secured along said arcuate side surface of said arm.

* * * * *